(12) United States Patent
Horiuchi

(10) Patent No.: US 11,701,809 B2
(45) Date of Patent: Jul. 18, 2023

(54) CONTROL DEVICE AND CONTROL METHOD FOR INJECTION MOLDING MACHINE

(71) Applicant: FANUC Corporation, Minamitsuru-gun (JP)

(72) Inventor: Atsushi Horiuchi, Yamanashi-ken (JP)

(73) Assignee: FANUC CORPORATION, Minamitsuru-Gun (JP)

(*) Notice: Subject to any disclaimer, the term of this patent is extended or adjusted under 35 U.S.C. 154(b) by 26 days.

(21) Appl. No.: 17/112,467

(22) Filed: Dec. 4, 2020

(65) Prior Publication Data
US 2021/0178649 A1    Jun. 17, 2021

(30) Foreign Application Priority Data

Dec. 11, 2019  (JP) ................... 2019-223381

(51) Int. Cl.
*B29C 45/77* (2006.01)
*B29C 45/46* (2006.01)
*B29C 45/50* (2006.01)

(52) U.S. Cl.
CPC ............ *B29C 45/77* (2013.01); *B29C 45/461* (2013.01); *B29C 45/50* (2013.01)

(58) Field of Classification Search
CPC ............... B29C 45/77; B29C 45/1808; B29C 2945/76006; B29C 2945/76187; B29C 2945/76354; B29C 2945/76568; B29C 2945/76605; B29C 2945/76665; B29C 2945/76846; B29C 2945/76939; B29C 2045/5096; B29C 45/461; B29C 45/50

USPC .......................... 264/40.3; 700/200
See application file for complete search history.

(56) References Cited

U.S. PATENT DOCUMENTS

| 6,340,439 B1* | 1/2002 | Hiraoka ................. B29C 45/47 264/40.5 |
| 2004/0096534 A1* | 5/2004 | Shiraishi ................. B29C 45/76 425/587 |
| 2007/0196530 A1* | 8/2007 | Shiraishi ................. B29C 45/50 425/149 |

FOREIGN PATENT DOCUMENTS

| JP | H07-214611 A | 8/1995 |
| JP | 2008-230164 A | 10/2008 |

* cited by examiner

*Primary Examiner* — Matthew J Daniels
*Assistant Examiner* — Gregory C. Grosso
(74) *Attorney, Agent, or Firm* — McGinn I.P. Law Group, PLLC

(57) ABSTRACT

A control device for an injection molding machine including a cylinder into which a resin is supplied, and a screw that moves forward and rearward and rotates inside the cylinder, includes a suck back control unit that sucks back the screw based on a predetermined suck back speed and a suck back distance or a suck back time period, a pressure acquisition unit that acquires a pressure of the resin, a calculation unit which calculates a compensation amount of the suck back speed, based on a difference between the pressure of the resin at a time when sucking back is completed and a predetermined target pressure, and a speed determination unit that newly determines the suck back speed based on the compensation amount.

12 Claims, 8 Drawing Sheets

| No. | TYPE OF SCREW 28 (SCREW DIAMETER) | TYPE OF RESIN | COEFFICIENT A |
|---|---|---|---|
| 1 | 20 | PA | 1 |
| 2 | 25 | PA | 2 |
| ⋮ | ⋮ | ⋮ | ⋮ |
| m-1 | 35 | PBT | 4 |
| m | 40 | PBT | 6 |
| ⋮ | ⋮ | ⋮ | ⋮ |

CONTROL DEVICE AND CONTROL METHOD FOR INJECTION MOLDING MACHINE

CROSS-REFERENCE TO RELATED APPLICATION

This application is based upon and claims the benefit of priority from Japanese Patent Application No. 2019-223381 filed on Dec. 11, 2019, the contents of which are incorporated herein by reference.

BACKGROUND OF THE INVENTION

Field of the Invention

The present invention relates to a control device and a control method for an injection molding machine.

Description of the Related Art

In the field of injection molding machines, a technique is known for preventing molding failures in which a resin leaks from a cylinder, by reducing of a resin pressure after the resin has been melted inside the cylinder. Such a technique is disclosed, for example, in Japanese Laid-Open Patent Publication No. 2008-230164. Such a molding failure in which the resin leaks from the cylinder is also referred to as drooling or leakage.

According to the disclosed technique, the injection molding machine performs sucking back in a sucking back step (pressure reducing step) following a metering step in which the resin is melted. Consequently, the resin pressure approaches a set pressure (target pressure P0) which is capable of preventing drooling.

SUMMARY OF THE INVENTION

Sucking back is performed by causing the screw to be moved rearward at a predetermined suck back speed. Further, sucking back is performed until a rearward movement distance of the screw reaches a predetermined suck back distance, or until a continuous time period during which sucking back takes place reaches a predetermined suck back time period.

In this instance, when sucking back is completed, cases may occur in which the resin pressure does not reach the target pressure. There are several possible causes why this might occur. As one of such reasons, it may be considered that the suck back speed has not been properly determined. However, in order to appropriately determine the suck back speed, the operator is required to perform trial and error attempts while taking into consideration material properties of the resin and specifications of the injection molding machine. From the standpoint of the operator, performing such tasks has been a burden.

Thus, the present invention has the object of providing a control device and a control method for an injection molding machine, in which an appropriate suck back speed can be newly determined in an easy manner, in the case that the resin pressure does not reach the target pressure even if sucking back is performed.

One aspect of the present invention is a control device for an injection molding machine, the injection molding machine including a cylinder into which a resin is supplied, and a screw configured to move forward and rearward and rotate inside the cylinder, the injection molding machine being configured to perform metering of the resin while the resin is being melted inside the cylinder, by causing the screw to be moved rearward to a predetermined metering position while being forwardly rotated, the control device including a suck back control unit configured to suck back the screw on the basis of a predetermined suck back speed and a suck back distance or a suck back time period, after the screw has reached the predetermined metering position, a pressure acquisition unit configured to acquire a pressure of the resin, a calculation unit configured to, based on a difference between the pressure of the resin at a time when sucking back is completed and a predetermined target pressure, calculate a compensation amount of the suck back speed that causes the pressure of the resin to reach the target pressure at a time when sucking back is performed on the basis of the suck back distance or the suck back time period, and a speed determination unit configured to newly determine the suck back speed based on the compensation amount.

Another aspect of the present invention is a method of controlling an injection molding machine, the injection molding machine including a cylinder into which a resin is supplied, and a screw configured to move forward and rearward and rotate inside the cylinder, the injection molding machine being configured to perform metering of the resin while the resin is being melted inside the cylinder, by causing the screw to be moved rearward to a predetermined metering position while being forwardly rotated, the method including a suck back control step of sucking back the screw on the basis of a predetermined suck back speed and a suck back distance or a suck back time period, after the screw has reached the predetermined metering position, a pressure acquisition step of acquiring a pressure of the resin at a time when sucking back is completed, a calculation step of calculating, based on a difference between the pressure of the resin at the time when sucking back is completed and a predetermined target pressure, a compensation amount of the suck back speed that causes the pressure of the resin to reach the target pressure at a time when sucking back is performed on the basis of the suck back distance or the suck back time period, and a speed determination step of newly determining the suck back speed based on the compensation amount.

According to the present invention, the control device and the control method for the injection molding machine are provided, in which the appropriate suck back speed can be newly determined in an easy manner, in the case that the resin pressure does not reach the target pressure even if sucking back is performed.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a diagram showing an example of a table;

DESCRIPTION OF THE PREFERRED EMBODIMENTS

Preferred embodiments of a control device and a control method for an injection molding machine according to the present invention will be presented and described in detail below with reference to the accompanying drawings. It should be noted that each of the directions discussed below conform to the arrows shown in the respective drawings.

EMBODIMENTS

Figure 1:
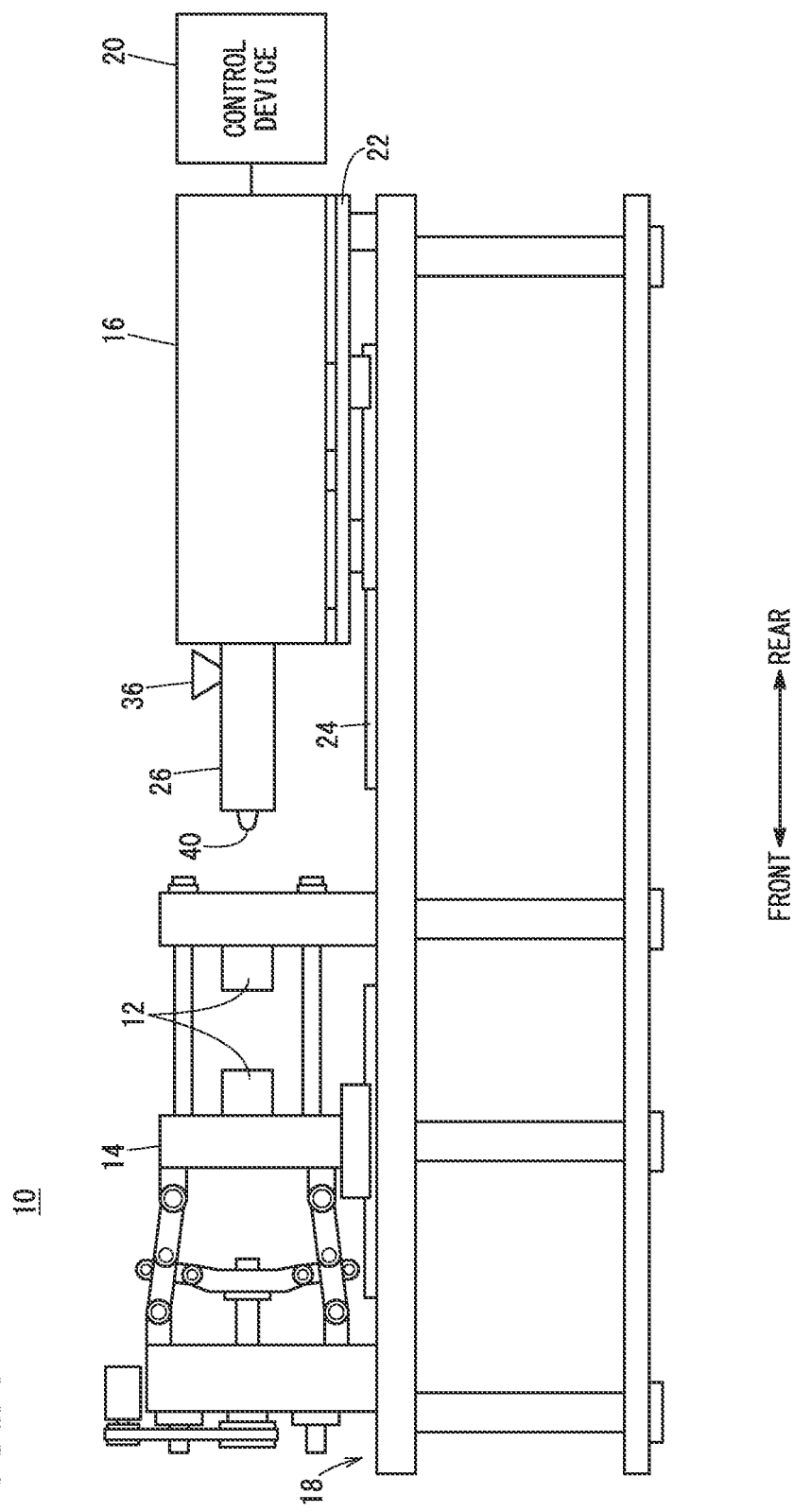
FIG. 1 is a side view of an injection molding machine according to an embodiment of the present invention.

FIG. 1 is a side view of an injection molding machine 10 according to an embodiment of the present invention.

The injection molding machine 10 according to the present embodiment comprises a mold clamping unit 14 having a mold 12 that is capable of being opened and closed, an injection unit 16 that faces toward the mold clamping unit 14 in a front-rear direction, a machine base 18 on which such components are supported, and a control device 20 for the injection molding machine 10.

Among such components, the mold clamping unit 14 and the machine base 18 can be configured based on a known technique. Accordingly, in the following discussion, descriptions of the mold clamping unit 14 and the machine base 18 will be appropriately omitted.

Prior to describing the control device 20 of the present embodiment, at first, a description will be given concerning the injection unit 16, which is a control target of the control device 20.

The injection unit 16 is supported by a base 22. The base 22 is supported by a guide rail 24 installed on the machine base 18 so that the base 22 is capable of moving forward and rearward. Consequently, the injection unit 16 becomes capable of moving forward and rearward on the machine base 18. Further, the injection unit 16 can move closer to and away from the mold clamping unit 14.

Figure 2:
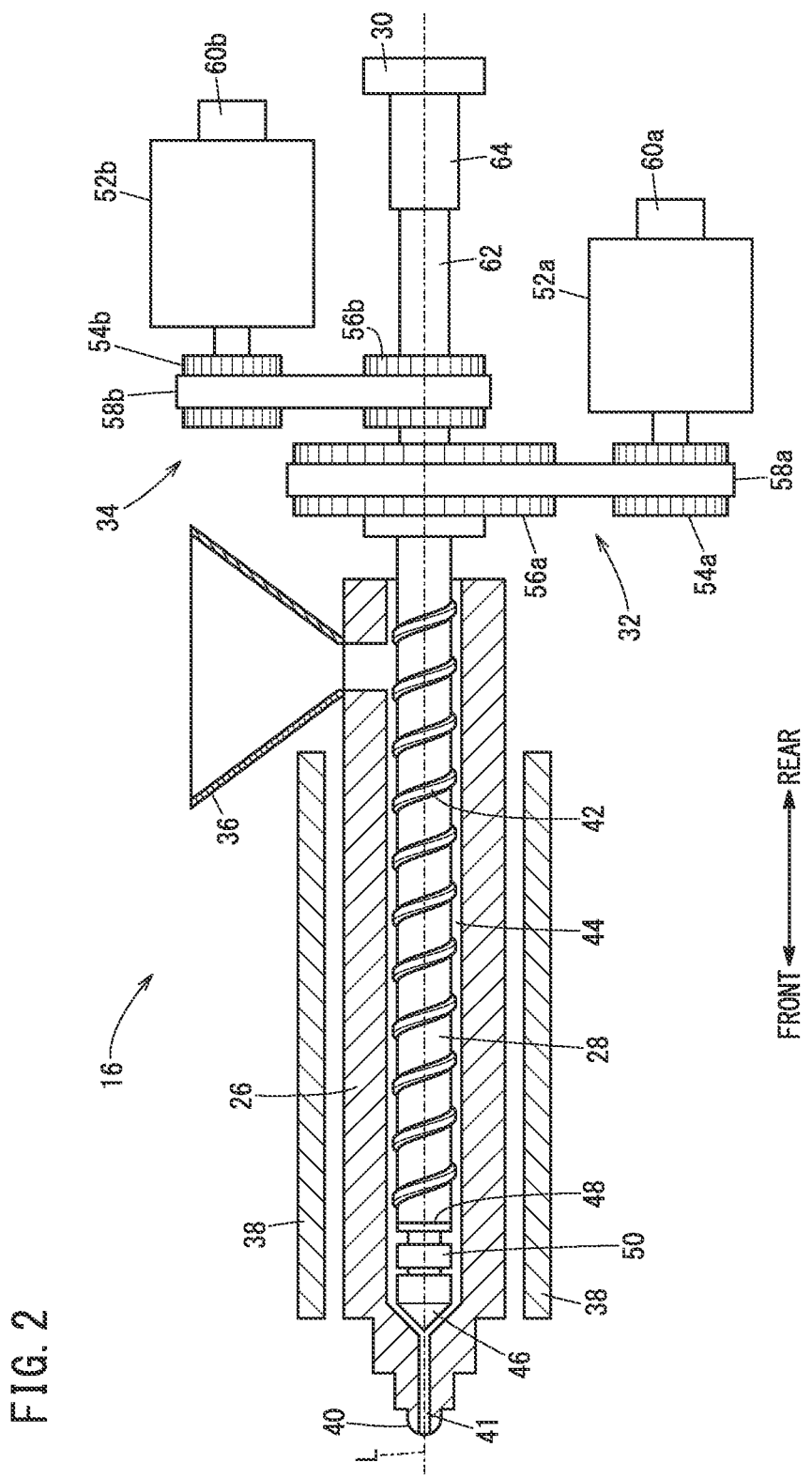
FIG. 2 is a schematic configuration diagram of an injection unit according to the embodiment.

FIG. 2 is a schematic configuration diagram of the injection unit 16.

The injection unit 16 is equipped with a tubular shaped heating cylinder (cylinder) 26, a screw 28 provided inside the cylinder 26, a pressure sensor 30 provided on the screw 28, and a first drive device 32 and a second drive device 34 connected to the screw 28.

The axial lines of the cylinder 26 and the screw 28 coincide with each other on an imaginary line L according to the present embodiment. Such a system may be referred to as an "in-line (in-line screw) system". Further, the injection molding machine to which the in-line system is applied is also referred to as an "in-line type injection molding machine".

Concerning advantages of an in-line type injection molding machine, several advantages are known. As examples thereof, there may be cited a point in which the structure of the injection unit 16 is simpler, and a point in which the maintainability thereof is excellent, as compared with other types of injection molding machines. In this instance, as another type of injection molding machine, for example, a preplasticating type injection molding machine is known.

As shown in FIG. 2, the cylinder 26 is equipped with a hopper 36 provided on a rearward side, a heater 38 for heating the cylinder 26, and a nozzle 40 provided on a frontward side thereof, i.e., at a distal end of the cylinder. Among such elements, the hopper 36 is provided with a supply port for supplying a molding material resin to the cylinder 26. An injection port that communicates with the interior and the exterior of the cylinder 26 is provided on the nozzle 40.

The screw 28 includes a spiral flight part 42 provided to span across the longitudinal (front-rear) direction thereof. The flight part 42, together with an inner wall of the cylinder 26, constitutes a spiral flow path 44. The spiral flow path 44 guides in a frontward direction the resin that is supplied from the hopper 36 into the cylinder 26.

The screw 28 includes a screw head 46 which is on a distal end on the frontward side, a check seat 48 that is disposed at a certain distance in a rearward direction from the screw head 46, and a check ring 50 (a ring for backflow-prevention) that is capable of moving between the screw head 46 and the check seat 48.

The check ring 50 moves in the frontward direction relative to the screw 28 when the check ring receives a forward pressure from the resin located on a rearward side of the check ring 50 itself. Relative movement of the check ring 50 in the frontward direction is performed, for example, at a later-described time of metering.

In this case, accompanying relative movement of the check ring 50, the flow path 44 is gradually opened. As a result, the resin can easily flow along the flow path 44 from the rearward side to the frontward side across the check seat 48.

Further, upon receiving a rearward pressure from the resin on the frontward side thereof, the check ring 50 moves in a rearward direction relatively with respect to the screw 28. Relative movement of the check ring 50 in the rearward direction is performed, for example, at a later-described time of injection.

In this case, the flow path 44 is gradually closed accompanying such relative movement of the check ring 50.

As a result, the flow of the resin is suppressed along the flow path 44 from the frontward side toward the rearward side across the check seat 48. In particular, when the check ring 50 is retracted to the check seat 48, at least the resin on the frontward side of the check ring 50 is placed in a state in which the flow of the resin to the rearward direction across the check seat 48 is maximally suppressed.

The pressure sensor 30, such as a load cell or the like for sequentially detecting the pressure imposed on the resin inside the cylinder 26, is attached to the screw 28. Hereinafter, the phrase "the pressure applied to the resin inside the cylinder 26" may also be simply referred to as a "resin pressure (pressure of a resin)".

The first drive device 32 serves to rotate the screw 28 inside the cylinder 26. The first drive device 32 comprises a servomotor 52a, a drive pulley 54a, a driven pulley 56a, and a belt member 58a. The drive pulley 54a rotates integrally with a rotary shaft of the servomotor 52a. The driven pulley 56a is disposed integrally on the screw 28. The belt member 58a transmits the rotational force of the servomotor 52a from the drive pulley 54a to the driven pulley 56a.

In accordance with the above-described first drive device 32, by the rotary shaft of the servomotor 52a being made to rotate, the rotational force thereof is transmitted to the screw 28 via the drive pulley 54a, the belt member 58a, and the driven pulley 56a. Consequently, the screw 28 can be rotated. Further, according to the above-described first drive device 32, by changing the direction in which the rotary shaft of the screw 28 of the servomotor 52a is rotated, in response to the changing, the direction of rotation of the screw can be switched between forward rotation and reverse rotation.

A position/speed sensor 60a is provided on the servomotor 52a. The position/speed sensor 60a detects the rotational position and the rotational speed of the rotary shaft of the servomotor 52a. The detection result therefrom is output to the control device 20. Consequently, the control device 20 is capable of calculating the amount of rotation (the rotation amount), the rotational acceleration, and the rotational speed of the screw 28, based on the rotational position and the rotational speed detected by the position/speed sensor 60a.

The second drive device 34 serves to move the screw 28 forward and rearward inside the cylinder 26. In the present embodiment, unless otherwise specified, the phrase "forward and rearward movement of the screw 28" implies forward and rearward movement of the screw 28 relative to the cylinder 26 inside which the screw 28 is provided.

The second drive device 34 comprises a servomotor 52b, a drive pulley 54b, a driven pulley 56b, a belt member 58b, a ball screw 62, and a nut 64. The drive pulley 54b rotates integrally with a rotary shaft of the servomotor 52b. The belt member 58b transmits the rotational force of the servomotor 52b from the drive pulley 54b to the driven pulley 56b. An axial line of the ball screw 62 and an axial line of the screw 28 coincide with each other on the imaginary line L. The nut 64 is screw-engaged with the ball screw 62.

In accordance with the above-described second drive device 34, by the rotary shaft of the servomotor 52b being made to rotate, the rotational force thereof is transmitted to the ball screw 62 via the drive pulley 54b, the belt member 58b, and the driven pulley 56b. The ball screw 62 converts the transmitted rotational force into linear motion and transmits the linear motion to the screw 28.

Consequently, the screw 28 can be moved forward and rearward. Further, according to the above-described second drive device 34, by changing the direction in which the rotary shaft of the servomotor 52b is rotated, in response to the changing, the movement direction of the screw 28 can be switched between forward movement (advancing) and rearward movement (retracting).

A position/speed sensor 60b is provided on the servomotor 52b. The position/speed sensor 60b detects the rotational position and the rotational speed of the rotary shaft of the servomotor 52b, and is a similar sensor to the position/speed sensor 60a. The detection result therefrom is output to the control device 20. Consequently, the control device 20 is capable of calculating the forward position and the rearward position (rearward movement distance) of the screw 28 in the front-rear direction, as well as the rearward movement speed (forward and rearward movement speed) of the screw 28, based on the rotational position and the rotational speed detected by the position/speed sensor 60b.

Hereinafter, a description will be given of a plurality of steps performed by the injection molding machine 10 in order to obtain molded products. In particular, a description will be given focused on operations that can be performed by the injection unit 16.

The injection unit 16 melts (plasticizes) the resin supplied to the cylinder 26 due to being heated by the heater 38 and by the rotational force of the screw 28, while the resin is fed and compressed in the frontward direction along the flow path 44 due to forward rotation of the screw 28. Such forward rotation of the screw 28 is started in a state in which the screw 28 has been fully advanced inside the cylinder 26 (a state in which the volume of the metering region is at a minimum). Further, the screw 28 undergoes forward rotation at a predetermined rotational speed.

The screw 28 is gradually moved rearward relatively with respect to the cylinder 26, accompanying the resin being fed and compressed in the frontward direction. The rearward movement speed of the retracted screw 28 is controlled by the control device 20, in a manner so that the resin pressure is maintained in the vicinity of a predetermined value (metering pressure) P1. A description will be given later concerning the configuration of the control device 20.

The resin that is melted while being fed and compressed reaches a region on the frontward side of the check seat 48 inside the cylinder 26, and is accumulated inside the region. Hereinafter, the region on the frontward side of the check seat 48 inside the cylinder 26 may also be referred to as a "metering region".

The forward rotation and rearward movement of the screw 28 are performed until the screw 28 reaches a predetermined position (metering position) by way of such rearward movement. More specifically, until the screw 28 arrives at the metering position, the resin inside the cylinder 26 continues to be fed and compressed toward the metering region while being melted.

The step of carrying out forward rotation and rearward movement until the screw 28 arrives at the metering position to thereby accumulate the molten resin in the metering region may also be referred to as a "metering step" or simply "metering". By performing such metering, a certain predetermined amount of the resin can be accumulated in the metering region.

Moreover, when metering is performed, it is necessary to specify in advance a metering pressure P1, and a predetermined rotational speed of the screw 28 that undergoes forward rotation. The metering pressure P1 and the predetermined rotational speed, which are specified in relation to metering, may also be referred to as "metering conditions".

After the screw 28 has arrived at the metering position, a step of causing the resin pressure in the metering region to be reduced from the metering pressure P1 to the target pressure P0 is carried out by further causing the screw 28 to be retracted (moved rearward) from the metering position. Such a step may also be referred to as a "pressure reducing step" or simply a "reduction in pressure".

Further, the operation of further moving rearward the screw 28 that has reached the metering position may also be referred to as "sucking back". When sucking back is carried out, the volume of the metering region is enlarged corresponding to the distance over which the screw 28 is moved rearward. Consequently, an expansion in the volume of the resin in the metering region, and more specifically, a decrease in the density of the resin takes place, and as a result, the resin pressure in the metering region is reduced.

Sucking back is performed on the basis of predetermined conditions in relation to sucking back. Hereinafter, such predetermined conditions may also be referred to as "suck back conditions". The suck back conditions may include designation (specification) of a suck back speed $V_{sb}$, as well as designation of a suck back distance $L_{sb}$ or designation of a suck back time period $T_{sb}$.

The suck back speed $V_{sb}$ is a rearward movement speed at which the screw 28 moves rearward of the cylinder 26 due to being sucked back. The suck back distance $L_{sb}$ is a distance over which the screw 28 undergoes rearward movement relatively with respect to the cylinder 26 due to being sucked back. The suck back time period $T_{sb}$ is a time period during which sucking back is continued.

As the target pressure P0, a pressure is specified which is smaller than the metering pressure P1 (P0<P1). Although the magnitude thereof is not particularly limited, for example, the value of atmospheric pressure (zero) can be specified.

The resin pressure in the metering region is in the vicinity of the metering pressure P1 immediately after the screw 28 has arrived at the metering position, i.e., immediately after metering has been carried out. By reducing the resin pressure from being in the vicinity of the metering pressure P1 to the target pressure P0, it is possible to weaken the forward momentum of the resin in the metering region, which has received the pressure directed toward the frontward direction in the metering step. Consequently, flowing of the resin in the metering region in the frontward direction is suppressed, and the occurrence of drooling is prevented.

In addition to being sucked back, causing the pressure of the resin in the metering region to be reduced can also be achieved by causing the screw 28 to be rotated (reversely rotated) in a direction opposite to that at the time of metering. However, in the present embodiment, a description concerning such a reduction in pressure due to reverse rotation is omitted.

After having carried out metering and a subsequent reduction in pressure, the resin accumulated in the metering region inside the cylinder 26 is filled into a cavity of the mold 12. Such a process is also referred to as an "injection step" or simply "injection".

Injection is performed in a state in which the mold 12 of the mold clamping unit 14 and the nozzle 40 of the injection unit 16 are pressed into contact with each other. Pressing of the mold 12 and the nozzle 40 against each other may also be referred to as "nozzle touching". When injection is carried out, the mold 12 is placed in a closed state, for example, by a well-known toggle mechanism provided in the mold clamping unit 14, and a mold clamping force is applied thereto. By advancement of the screw 28, the injection unit 16 pushes out the resin in the metering region, through the nozzle 40, into the cavity of the mold 12 to which the mold clamping force is applied.

Consequently, the cavity is filled with the resin.

Immediately after injection, the screw 28 is in a state of being fully advanced inside the cylinder 26.

Accordingly, after injection, the injection unit 16 can perform metering again. In this manner, the injection unit 16 is capable of efficiently and repeatedly carrying out metering, reduction in pressure, and injection in this order.

On the other hand, in the mold clamping unit 14, cooling and solidification of the resin that is filled in the mold 12 by executing injection, opening of the mold 12, and removal of the solidified resin (a molded product) are carried out. The step of cooling the resin that is filled in the mold 12 may also be referred to as a "cooling step" or simply "cooling". Further, the step of opening the mold 12 may also be referred to as a "mold opening step" or simply "mold opening". Further, the step of removing the molded product may also be referred to as a "removal step" or simply "removal".

Between the steps of mold opening and removal, the molded product may be ejected from the mold 12 by a known ejector (ejecting pin) provided in the mold clamping unit 14. This step may also be referred to as an "ejecting step" or simply "ejection". By ejection of the molded product, subsequent removal of the molded product can be easily accomplished.

Further, by closing the mold 12 after having removed the molded product, the mold 12 can be placed in a state in which the resin can be filled therein again. Further, the step of closing the mold 12 may also be referred to as a "mold closing step" or simply "mold closing". In the foregoing manner, the mold clamping unit 14 can repeatedly perform cooling, mold opening, ejection, removal, and mold closing in this order.

The plurality of steps described above can be performed routinely as a "molding cycle". By repeatedly executing the molding cycle, the injection molding machine 10 is capable of efficiently mass producing molded products. The time required to complete one molding cycle may also be referred to as a "cycle time".

Next, a description will be given concerning matters that can be considered in order to obtain high quality molded products. In order to obtain high quality molded products, it is desirable to reduce insofar as possible the occurrence of defects during execution of the molding cycle. Defects that occur during execution of the molding cycle may also be referred to as molding defects. The aforementioned drooling is a typical example of such a molding defect. Further, mixing of air (foreign matter) into the metered resin may also be cited as an example of a molding defect.

In order to reduce any concern over drooling, preferably the pressure of the resin after metering should be made to reach the target pressure P0 in the pressure reducing step, by appropriately performing sucking back.

However, even if sucking back is performed, cases may occur in which the resin pressure does not reach the target pressure P0. As one reason therefor, it may be considered that the suck back speed $V_{sb}$ is too small in relation to the specified suck back distance $L_{sb}$ or the suck back time period $T_{sb}$. In this case, by newly determining the suck back speed $V_{sb}$, it is possible to improve the situation in which the resin pressure does not reach the target pressure P0.

However, the appropriate suck back speed $V_{sb}$ may be unclear or unknown to the operator at first glance. In addition, if the specified suck back speed $V_{sb}$ is excessive, excessive drawing in of air into the interior of the metering region occurs when sucking back is performed. In such a case, mixing of air (foreign material) into the resin disadvantageously takes place.

As can be appreciated from the above, in order for the operator to appropriately specify the suck back speed $V_{sb}$ which can suitably prevent the occurrence of molding defects, the operator is required to perform trial and error attempts while taking into consideration material properties of the resin and specifications of the injection molding machine 10. From the standpoint of the operator, performing such tasks is a burden.

Moreover, in order for the resin pressure to reach the target pressure P0 by being sucked back, in addition to newly determining the suck back speed $V_{sb}$, as a countermeasure, the suck back distance $L_{sb}$ or the suck back time period $T_{sb}$ may be newly determined to be longer. However, even in that case, if an appropriate suck back distance $L_{sb}$ or an appropriate suck back time period $T_{sb}$ is not known, ultimately, the operator will be required to perform trial and error attempts. Further, if the suck back distance $L_{sb}$ or the suck back time period $T_{sb}$ is lengthened without changing the suck back speed $V_{sb}$, the cycle time disadvantageously becomes longer. In such a case, the time-wise efficiency in relation to the production of molded products deteriorates.

Thus, according to the present embodiment, the control device 20 is made to newly determine the suck back speed $V_{sb}$ which is capable of causing the resin pressure to reach the target pressure P0 at the time when sucking back is performed on the basis of a predetermined suck back distance $L_{sb}$ or a predetermined suck back time period $T_{sb}$. A description will be given in detail below concerning the control device 20 of the present embodiment.

Figure 3:
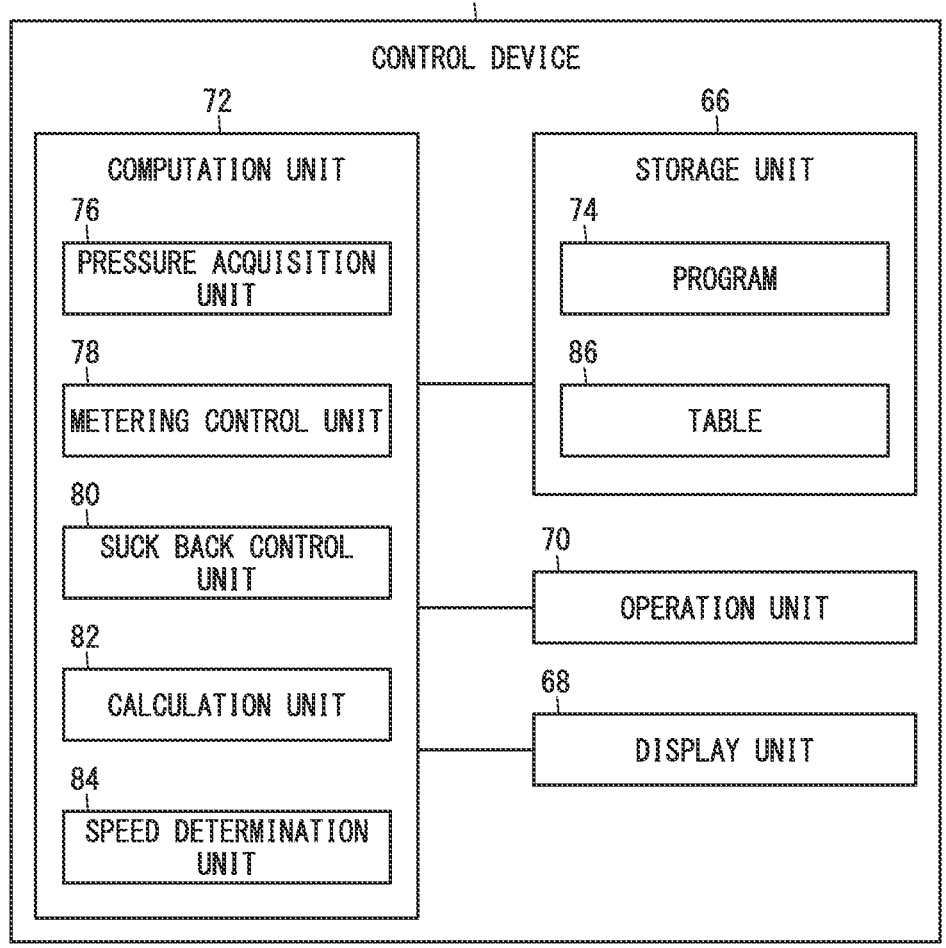
FIG. 3 is a schematic configuration diagram of a control device according to the embodiment.

FIG. 3 is a schematic configuration diagram of the control device 20.

From among the mold clamping unit 14 and the injection unit 16 provided in the injection molding machine 10, the control device 20 according to the present embodiment controls at least the injection unit 16. The control device 20 is equipped with a storage unit 66, a display unit 68, an operation unit 70, and a computation unit 72.

Among these units, the storage unit 66 may include a volatile memory and a nonvolatile memory, neither of which is shown. The volatile memory can be configured by hardware such as a RAM (Random Access Memory) or the like. The nonvolatile memory can be configured by hardware such as a ROM (Read Only Memory), a flash memory, or the like.

A predetermined program 74 for controlling the injection unit 16 is stored in advance in the storage unit 66. Further, the storage unit 66 appropriately stores information necessary for controlling the injection unit 16. Among such information, descriptions will be given below concerning information in the present embodiment which is deserving of particular explanation, as necessary.

Although not limited to this feature, the display unit 68, for example, is a display device equipped with a liquid crystal screen. The display unit 68 appropriately displays information concerning the controls performed by the control device 20.

Although not limited to this feature, the operation unit 70 comprises, for example, a keyboard, a mouse, or a touch panel that can be attached to the screen (liquid crystal screen) of the display unit 68. The operation unit 70 can be used by the operator in order to transmit commands to the control device 20.

The computation unit 72 may be configured by hardware such as, for example, a CPU (Central Processing Unit) or the like. The computation unit 72 includes a pressure acquisition unit 76, a metering control unit 78, a pressure reduction control unit (suck back control unit) 80, a calculation unit 82, and a speed determination unit 84. These units each can be realized by the computation unit 72 executing the program 74 in cooperation with the storage unit 66. Hereinafter, descriptions will be given concerning each of such units.

The pressure acquisition unit 76 sequentially acquires the resin pressure detected by the pressure sensor 30. Although not limited to this feature, the acquired resin pressure is stored in the storage unit 66, for example, in the form of time series data. The data in relation to the stored resin pressure can be referred to by other components such as the metering control unit 78. Further, the operator may be made capable of monitoring such data by displaying the data on the display unit 68.

Among the controls of the injection unit 16, the metering control unit 78 carries out a control particularly in relation to metering. More specifically, initially, in the case that the metering conditions are stored in the storage unit 66 in advance, the metering control unit 78 acquires the metering conditions by referring to the storage unit 66. Moreover, the metering control unit 78 may acquire, as the metering conditions, values for the metering pressure P1 or the rotational speed of the screw 28, which are instructed or specified by the operator via the operation unit 70.

By supplying a drive current to the servomotor 52a of the first drive device 32, the metering control unit 78 rotates the screw 28 forwardly based on the acquired metering conditions. Further, while referring to the resin pressure acquired by the pressure acquisition unit 76, the metering control unit 78 adjusts the drive current supplied to the servomotor 52b of the second drive device 34, thereby causing the screw 28 to be moved rearward to the metering position while maintaining the resin pressure in the vicinity of the metering pressure P1.

Among the controls of the injection unit 16, the pressure reduction control unit 80 carries out a control particularly in relation to reducing pressure. More specifically, initially, in the case that the suck back conditions are stored in the storage unit 66 in advance, the pressure reduction control unit 80 acquires the suck back conditions by referring to the storage unit 66. Moreover, the pressure reduction control unit 80 may acquire as the suck back conditions the suck back speed $V_{sb}$, and the suck back time period $T_{sb}$ or the suck back distance $L_{sb}$, which are instructed or specified by the operator via the operation unit 70.

After the screw 28 has reached the predetermined metering position, the pressure reduction control unit 80, by supplying a drive current to the servomotor 52b, performs sucking back based on the acquired suck back conditions. Consequently, the resin pressure, which is in the vicinity of the metering pressure P1, can be brought in closer proximity to the target pressure P0.

The calculation unit 82 calculates a difference $P_{diff}$ between the resin pressure at the time that sucking back is completed and the predetermined target pressure P0. Further, based on the difference $P_{diff}$, the calculation unit 82 calculates a compensation amount $V_{diff}$ for the suck back speed $V_{sb}$ that causes the resin pressure to reach the target pressure P0 when sucking back is performed based on the suck back distance $L_{sb}$ or the suck back time period $T_{sb}$. The resin pressure at the time that sucking back is completed can be acquired by the pressure acquisition unit 76.

The calculation unit 82 determines the compensation amount $V_{diff}$ based on the following Equation (1). Within the following Equation (1), the character A is a coefficient of the difference $P_{diff}$ in Equation (1), which will be described later.

$$V_{diff} = A \cdot P_{diff} \tag{1}$$

A further description will now be given concerning the coefficient A. A specific value of the coefficient A is determined corresponding to the type of the screw 28 (a classification or the like according to a length of the diameter of the screw 28) and the type of the resin, and is obtained experimentally in advance.

FIG. 4 is a diagram showing an example of a table 86. The table 86 of FIG. 4 defines a plurality of coefficients A corresponding to types of the screw 28 and types of the resin, and is stored in the storage unit 66. In FIG. 4, the variable m is an integer. In this manner, by obtaining such values experimentally in advance, a corresponding relationship between specific numerical values of the coefficient A and the type of the screw 28 or the type of the resin can be established in the form of a table. By referring to the table 86 and based on the type of the screw 28 and the type of the resin, the calculation unit 82 is capable of quickly and easily selecting the coefficient A that should be applied to Equation (1).

When referring to the table 86 in order to determine the coefficient A, if the information associated with the coefficient A in the table 86 is information concerned with the type of the screw 28 or the type of the resin, such information serves as a reference key. The information serving as the reference key can be specified beforehand to the calculation unit 82 by the operator via the operation unit 70.

Moreover, the above-described corresponding relationship and the numerical values specified in the table 86 are not necessarily limited to what is shown in FIG. 4. For example, the types of the screw 28 or the types of the resin may be omitted from the table 86. Further, in that case, the coefficient A may be selected by using, as a key, only one of the type of the screw 28 and the type of the resin specified in the table 86.

The speed determination unit 84, on the basis of the compensation amount $V_{diff}$ calculated by the calculation unit 82, newly determines the suck back speed $V_{sb}$ that causes the resin pressure to reach the target pressure P0 at the time when sucking back is performed based on the suck back distance $L_{sb}$ or the suck back time period $T_{sb}$.

Hereinafter, for the sake of distinguishing it, the suck back speed $V_{sb}$ which is newly determined by the speed determination unit 84 is also referred to as a suck back speed V'sb. The speed determination unit 84 determines the suck back speed V'sb based on the following Equation (2). Within the following Equation (2), the term $V_{sb}$ is the suck back speed $V_{sb}$ originally specified in the suck back conditions.

$$'V_{sb}=V_{sb}+V_{diff} \qquad (2)$$

Upon determining the suck back speed V'sb, the speed determination unit 84 changes the designation of the suck back conditions from the original suck back speed $V_{sb}$ to the suck back speed $V'_{sb}$. At this time, there is no particular necessity to change the suck back distance $L_{sb}$ or the suck back time period $T_{sb}$.

Further, the speed determination unit 84 stores the suck back conditions including the suck back speed $V'_{sb}$ and the suck back distance $L_{sb}$ or the suck back time period $T_{sb}$ in the storage unit 66. Consequently, the pressure reduction control unit 80 is capable of acquiring the suck back conditions including the suck back speed $V'_{sb}$ from the storage unit 66 when sucking back is performed the next time, and is capable of performing sucking back based on the acquired suck back speed $V'_{sb}$.

An exemplary configuration of the control device 20 has been described above. It should be noted that the configuration of the control device 20 is not limited to the above description. For example, the control device 20 may further comprise a configuration for controlling the mold clamping unit 14. Further, the injection molding machine 10 which is capable of being controlled by the control device 20 is not limited to being an in-line type injection molding machine.

Next, a description will be given below concerning a control method for the injection molding machine 10 according to the present embodiment.

Figure 5:
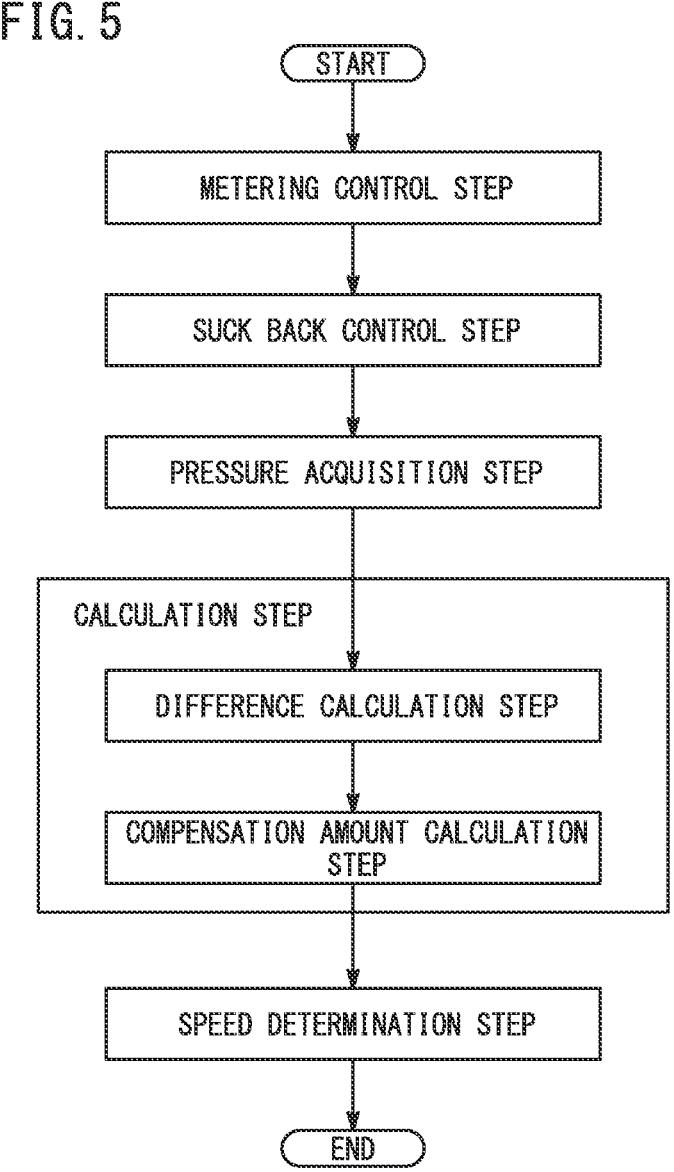
FIG. 5 is a flowchart showing an example of a control method for the injection molding machine according to the embodiment.

FIG. 5 is a flowchart showing an example of the control method for the injection molding machine 10 according to the present embodiment.

The control method for the injection molding machine 10 according to the present embodiment (hereinafter, simply referred to as a "control method") is executed by the above-described control device 20. As shown in FIG. 5, such a control method includes a suck back control step, a pressure acquisition step, a calculation step, and a speed determination step. Hereinafter, a description will be given concerning such a control method.

It is assumed that the control method according to the present embodiment is initiated from a metering control step (metering step). The present step is executed by the metering control unit 78 in the present embodiment.

The metering control step continues until the screw 28 reaches the metering position. When the screw 28 arrives at the metering position, the suck back control step is initiated. The present step is executed by the suck back control unit 80 in the present embodiment.

Hereinafter, a description will be given assuming that a designation of the suck back speed $V_{sb}$ and a designation of the suck back distance $L_{sb}$ are included in the suck back conditions. The suck back control unit 80 performs sucking back based on the suck back conditions. During sucking back, the screw 28 is moved rearward at the specified suck back speed $V_{sb}$. Sucking back is completed when the rearward movement distance of the screw 28 has reached the suck back distance $L_{sb}$.

Subsequently, the pressure acquisition step is initiated. In the pressure acquisition step, the pressure of the resin when sucking back has been completed is acquired. In the present embodiment, acquisition of the resin pressure can be carried out by the pressure acquisition unit 76.

After the pressure acquisition step, the calculation step is initiated. The calculation step includes a difference calculation step, and a compensation amount calculation step which is performed after the difference calculation step. These steps can be performed by the calculation unit 82 according to the present embodiment.

In the difference calculation step, the difference $P_{diff}$ between the resin pressure at the time that sucking back of the screw 28 is completed and the predetermined target pressure P0 is calculated. Further, in the compensation amount calculation step, the compensation amount $V_{diff}$ for the suck back speed $V_{sb}$ in order to cause the resin pressure to reach the target pressure P0 when sucking back is performed based on the suck back distance $L_{sb}$ or the suck back time period $T_{sb}$ is calculated. The above-described equation (1) and the table 86 can be used for the calculation in the compensation amount calculation step.

Subsequently, the speed determination step is initiated. The present step can be performed by the speed determination unit 84 according to the present embodiment. In the present step, the suck back speed $V'_{sb}$, which causes the resin pressure to reach the target pressure P0 when sucking back is performed on the basis of the suck back distance $L_{sb}$, is calculated based on the compensation amount $V_{diff}$. The above-described Equation (2) can be used when such a calculation is performed.

Further, the calculated suck back speed $V'_{sb}$ is set in the suck back conditions instead of the suck back speed $V_{sb}$ that was previously included in the suck back conditions. The modified suck back conditions can be stored in the storage unit 66. Consequently, the suck back speed $V_{sb}$ specified in the suck back conditions is newly determined as the suck back speed $V'_{sb}$.

Moreover, the speed determination step may be skipped, in the case that the difference $P_{diff}$ calculated in the calculation step is zero, or alternatively, falls within a predetermined allowable range.

According to the above-described control method, the suck back speed $V'_{sb}$, which causes the resin pressure to reach the target pressure P0 when sucking back is performed on the basis of the suck back distance $L_{sb}$, is easily calculated. Moreover, by replacing the suck back distance $L_{sb}$ with the suck back time period Tab, the description concerning the aforementioned control method can be applied also in the case that the suck back time period $T_{sb}$ is specified in the suck back conditions.

By carrying out sucking back based on the calculated suck back speed $V'_{sb}$, it is possible to suitably reduce any concern over molding defects such as drooling and mixing of air into the resin. As a result, the operator is capable of easily manufacturing high quality molded products.

Further, in the present embodiment, the suck back speed $V_{sb}$ is changed within the suck back conditions. However, there is no particular necessity to change the suck back distance $L_{sb}$ or the suck back time period $T_{sb}$ within the suck back conditions. Therefore, it is possible to prevent the cycle time from disadvantageously becoming lengthened due to changing the suck back conditions.

In the foregoing manner, according to the present embodiment, the control device 20 and the control method for the injection molding machine 10 are provided, in which the appropriate suck back speed $V_{sb}$ can be newly determined in an easy manner, in the case that the resin pressure does not reach the target pressure P0 even if sucking back is performed.

[Modifications]

Although an embodiment has been described above as one example of the present invention, it goes without saying that various modifications or improvements are capable of being added to the above-described embodiment. It is clear from the scope of the claims that other modes to which such modifications or improvements have been added can be included within the technical scope of the present invention.

(Modification 1)

Figure 6:
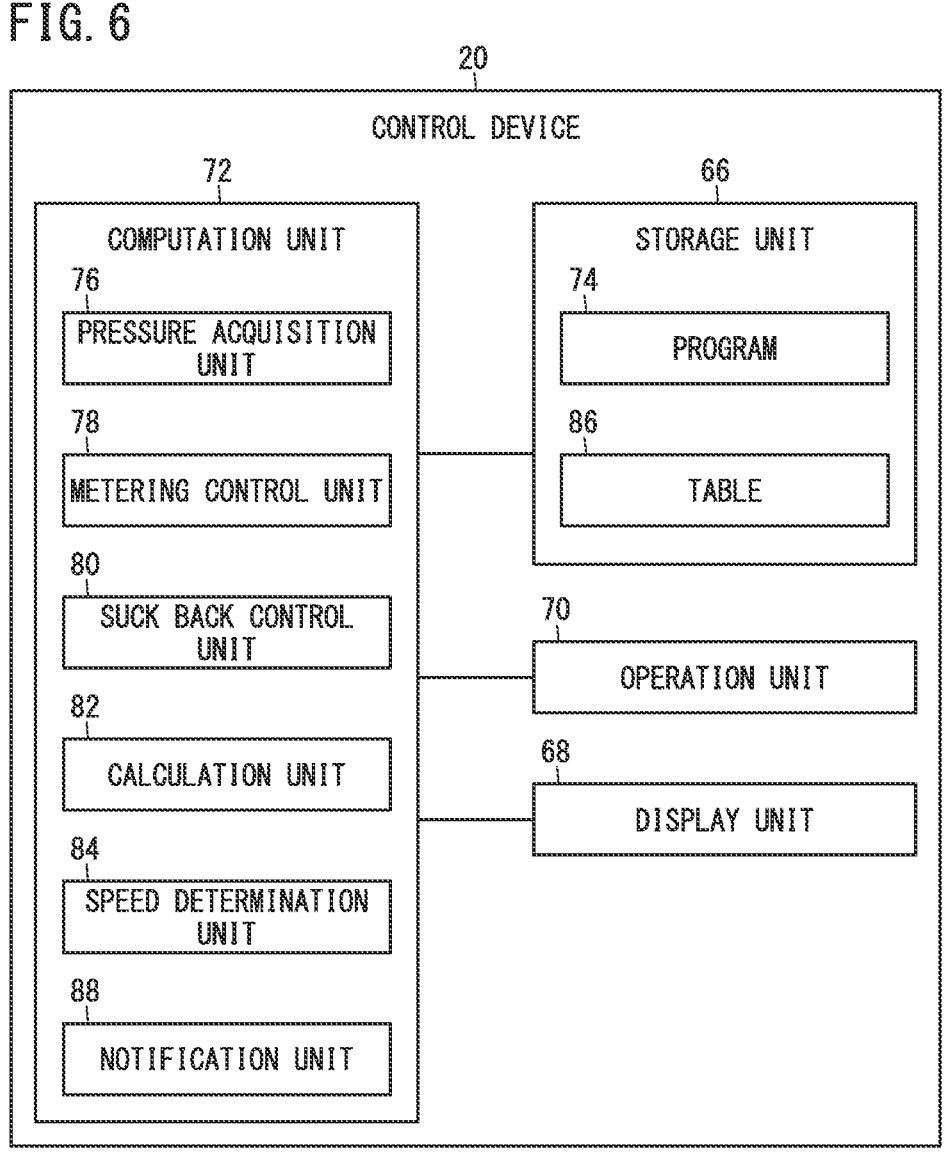
FIG. 6 is a schematic configuration diagram of a control device according to a first modification.

FIG. 6 is a schematic configuration diagram of the control device 20 according to a first modification.

The control device 20 may further be equipped with a notification unit 88 that issues a notification of at least one of the difference $P_{diff}$ and the compensation amount $V_{diff}$ calculated by the calculation unit 82, and the suck back speed $V'_{sb}$ newly determined by the speed determination unit 84. Consequently, the operator can easily grasp the difference $P_{diff}$, the compensation amount $V_{diff}$, or the suck back speed $V'_{sb}$.

Such a notification can be performed, for example, by causing the difference $P_{diff}$ or the suck back speed $V'_{sb}$ to be displayed on the display unit 68. Although the form of the notification in this case is not limited, the change of at least one of the difference $P_{diff}$, the compensation amount $V_{diff}$, and the suck back speed $V'_{sb}$ over a plurality of molding cycles is preferably displayed on the display unit 68, for example, in the form of a graph or a list.

Figure 7:
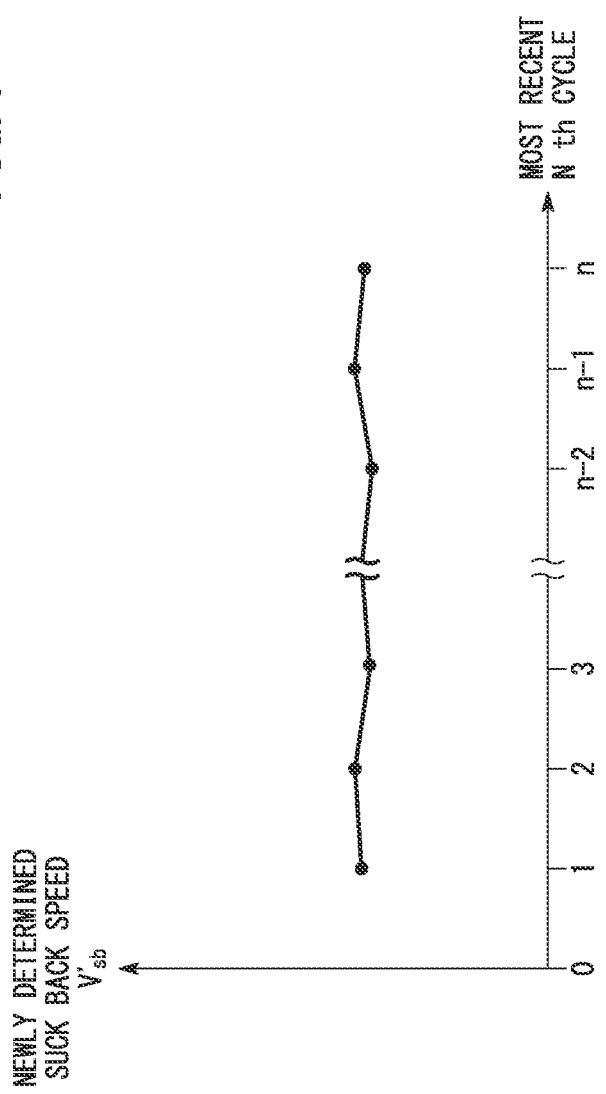
FIG. 7 is a diagram showing an example of information to be displayed on a display unit by a notification unit according to the first modification.

FIG. 7 is a diagram showing an example of information to be displayed on the display unit 68 by the notification unit 88 according to the first modification. Within the graph shown in FIG. 7, the vertical axis (newly determined suck back speed $V'_{sb}$) represents the newly determined suck back speed, and the horizontal axis (most recent Nth cycle) represents the number of molding cycles. The variable N is a natural number of greater than or equal to 1.

In FIG. 7, an example is shown of the information displayed on the display unit 68 when transitioning (changing) of the suck back speed $V'_{sb}$ is displayed on the display unit 68 over N times of the molding cycle that have taken place in the past. In this manner, by visually displaying the transitioning of at least one of the difference $P_{diff}$, the compensation amount $V_{diff}$, and the suck back speed $V'_{sb}$, the operator can easily grasp whether or not the injection molding machine 10 is stably operated.

In FIG. 7, the specific numerical value of N is a value of greater than or equal to 3, however, the present invention is not limited to the aspect shown in FIG. 7. As the specific numerical value of N, a default value specified by the manufacturer of the injection molding machine 10 may be used, or the operator may be allowed to specify the value via the operation unit 70.

(Modification 2)

Figure 8:
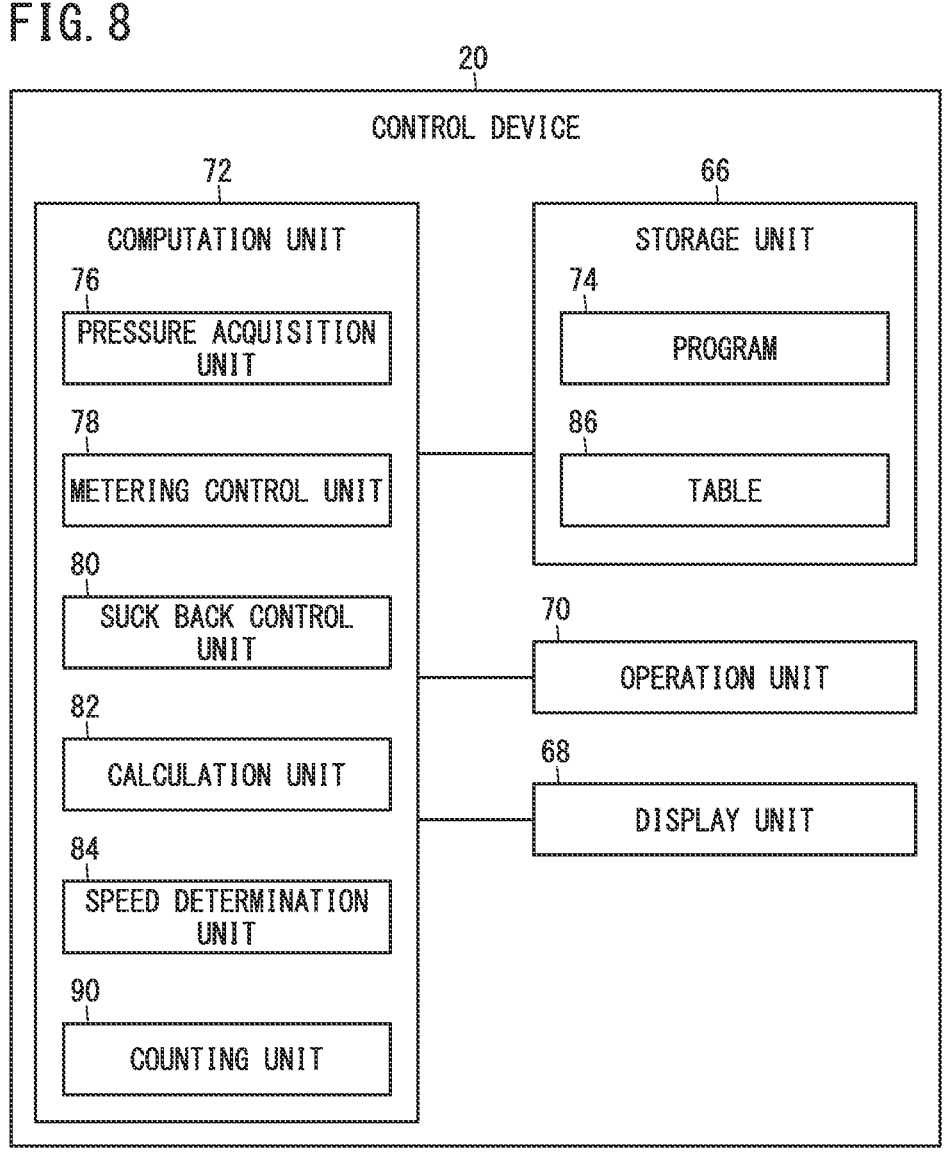
FIG. 8 is a schematic configuration diagram of a control device according to a second modification.

FIG. 8 is a schematic configuration diagram of the control device 20 according to a second modification.

The storage unit 66 possessed by the control device 20 may cumulatively store the compensation amount $V_{diff}$ calculated in the past by the calculation unit 82. Further, the control device 20 may further be equipped with a counter (counting unit) 90 which counts the number of times that the calculation unit 82 has calculated the compensation amount $V_{diff}$.

In the present modification, the speed determination unit 84 does not determine the suck back speed $V'_{sb}$ based on the compensation amount $V_{diff}$ until the number of times that the calculation unit 82 has calculated the compensation amount $V_{diff}$ reaches a predetermined number of times. More specifically, until the molding cycle is repeated a certain number of times, calculation of the compensation amount $V_{diff}$ by the calculation unit 82, and cumulative storage of the compensation amount $V_{diff}$ by the storage unit 66 are carried out, however, newly determining the suck back speed $V'_{sb}$ by the speed determination unit 84 is not carried out in the present modification. The counter 90 counts the number of times that the calculation unit 82 has calculated the compensation amount $V_{diff}$.

When the number of times that the calculation unit 82 has calculated the compensation amount $V_{diff}$ reaches a predetermined number of times, the speed determination unit 84 according to the present modification obtains one of a minimum value, a maximum value, an average value, a median value, and a mode value of the plurality of compensation amounts $V_{diff}$ that are stored in the storage unit 66. In addition, the speed determination unit 84 determines the obtained value as the suck back speed $V'_{sb}$. By determining the suck back speed $V'_{sb}$ based on the plurality of compensation amounts $V_{diff}$, even if the compensation amount $V_{diff}$ calculated in a certain molding cycle is affected by noise, the influence of such noise on calculation of the suck back speed $V'_{sb}$ can be reduced. Thus, according to the present modification, the speed determination unit 84 can determine the suck back speed $V'_{sb}$ with higher reliability.

The configuration of the present modification may be useful, for example, in the case that the suck back speed $V'_{sb}$ is determined in advance by conducting a trial run of the injection molding machine 10 prior to actual operation thereof. As the predetermined number of times, a default value specified by the manufacturer of the injection molding machine 10 may be used, or the operator may be allowed to specify the value via the operation unit 70.

(Modification 3)

The above-described embodiments and the modifications thereof may be appropriately combined within a range in which no technical inconsistencies occur.

[Inventions that can be Obtained from the Embodiment]

The inventions that can be grasped from the above-described embodiment and the modifications thereof will be described below.

<First Invention>

The control device (20) for the injection molding machine (10) is provided. The injection molding machine includes the cylinder (26) into which the resin is supplied, and the screw (28) that move forward and rearward and rotates inside the cylinder (26). The injection molding machine performs metering of the resin while the resin is being melted inside the cylinder (26), by causing the screw (28) to be moved rearward to the predetermined metering position while being forwardly rotated. The control device includes the suck back control unit (80) that sucks back the screw (28) on the basis of the predetermined suck back speed ($V_{sb}$) and the suck back distance ($L_{sb}$) or the suck back time period ($T_{sb}$), after the screw (28) has reached the predetermined metering position, the pressure acquisition unit (76) that acquires the pressure of the resin, the calculation unit (82) which, based on the difference ($P_{diff}$) between the pressure of the resin at the time when sucking back is completed and the predetermined target pressure (P0), calculates the compensation amount ($V_{diff}$) of the suck back speed ($V_{sb}$) that causes the pressure of the resin to reach the target pressure (P0) at a time when sucking back is performed on the basis of the suck back distance ($L_{sb}$) or the suck back time period ($T_{sb}$), and the speed determination unit (84) which newly determines the suck back speed ($V'_{sb}$) based on the compensation amount ($V_{diff}$).

In accordance with such features, the control device (20) for the injection molding machine (10) is provided, in which the appropriate suck back speed ($V'_{sb}$) is newly determined in an easy manner, in the case that the resin pressure does not reach the target pressure (P0) even if sucking back is performed.

The control device may further include the table (86) in which there are defined the plurality of coefficients (A) corresponding to types of the screw (28), wherein the calculation unit (82) may select one of the coefficients (A) by referring to the table (86) and based on the type of the screw (28), and may calculate the compensation amount ($V_{diff}$) based on the product of the selected coefficient (A) and the difference ($P_{diff}$). In accordance with such features, the calculation unit (82) can quickly and easily select the coefficient (A).

In the table (86), there may be defined a plurality of the coefficients (A) corresponding to types of the screw (28) and types of the resin, and the calculation unit (82) may select one of the coefficients (A) by referring to the table (86) and based on the type of the screw (28) and the type of the resin. In accordance with such features, the calculation unit (82) can quickly and easily select the coefficient (A).

The control device may further include the operation unit (70) through which the operator instructs the target pressure (P0). In accordance with this feature, the operator is capable of easily instructing or specifying the target pressure (P0) desired by the operator.

The control device may further include the notification unit (88) that issues a notification of at least one of the difference ($P_{diff}$) calculated by the calculation unit (82), the compensation amount ($V_{diff}$) calculated by the calculation unit (82), and the suck back speed ($V'_{sb}$) newly determined by the speed determination unit (84). In accordance with this feature, the operator can easily grasp the difference ($P_{diff}$), the compensation amount ($V_{diff}$), or the suck back speed ($V'_{sb}$).

The control device may further include the counting unit (90) which counts the number of times that the calculation unit (82) has calculated the compensation amount ($V_{diff}$), and the storage unit (66) that cumulatively stores the compensation amount ($V_{diff}$) calculated by the calculation unit (82), wherein, the speed determination unit does not newly determine the suck back speed ($V'_{sb}$) based on the compensation amount ($V_{diff}$) until the number of times that the calculation unit (82) has calculated the compensation amount ($V_{diff}$) reaches a predetermined number of times, and when the number of times that the calculation unit (82) has calculated the compensation amount ($V_{diff}$) reaches the predetermined number of times, the speed determination unit (84) obtains one of a minimum value, a maximum value, an average value, a median value, and a mode value of the plurality of compensation amounts ($V_{diff}$) stored in the storage unit (66), and newly determines the suck back speed ($V'_{sb}$) based on the obtained value. In accordance with such features, the speed determination unit (84) is capable of determining the suck back speed ($V'_{sb}$) with higher reliability.

<Second Invention>

The method of controlling the injection molding machine (10) is provided. The injection molding machine includes the cylinder (26) into which the resin is supplied, and the screw (28) that moves forward and rearward and rotates inside the cylinder (26). The injection molding machine performs metering of the resin while the resin is being melted inside the cylinder (26), by causing the screw (28) to be moved rearward to the predetermined metering position while being forwardly rotated. The method includes the suck back control step of sucking back the screw (28) on the basis of the predetermined suck back speed ($V_{sb}$) and the suck back distance ($L_{sb}$) or the suck back time period ($T_{sb}$), after the screw (28) has reached the predetermined metering position, the pressure acquisition step of acquiring the pressure of the resin at a time when sucking back is completed, the calculation step of calculating, based on the difference ($P_{diff}$) between the pressure of the resin at the time when sucking back is completed and the predetermined target pressure (P0), the compensation amount ($V_{diff}$) of the suck back speed ($V_{sb}$) that causes the pressure of the resin to reach the target pressure (P0) at the time when sucking back is performed on the basis of the suck back distance ($L_{sb}$) or the suck back time period ($T_{sb}$), and the speed determination step of newly determining the suck back speed ($V'_{sb}$) based on the compensation amount ($V_{diff}$).

In accordance with such features, the method of controlling the injection molding machine (10) is provided, in which the appropriate suck back speed ($V'_{sb}$) can be newly determined in an easy manner, in the case that the resin pressure does not reach the target pressure (P0) even if sucking back is performed.

What is claimed is:

1. A control device for an injection molding machine, the injection molding machine including a cylinder into which a resin is supplied, and a screw configured to move forward and rearward and rotate inside the cylinder, the injection molding machine being configured to perform metering of the resin while the resin is being melted inside the cylinder, by causing the screw to he moved rearward to a predetermined metering position while being forwardly rotated, the control device comprising a memory storing computer executable instructions, and a processor executing the instructions, the processor configured to execute the computer-executable instructions to cause the control device to:

suck back the screw, based on a predetermined suck back speed and a suck back distance or a suck back time period, after the screw has reached the predetermined metering position;

acquire a pressure of the resin from a sensor;

based on a difference between the pressure of the resin at a time when sucking back is completed and a predetermined target pressure, calculate a compensation amount of the suck back speed that causes the pressure of the resin to reach the target pressure at a time when sucking back is performed based on the suck back distance or the suck back time period;

newly determine the suck back speed based on the compensation amount; and send a control signal to the injection molding machine to instruct the injection molding machine to suck back the screw of the injection molding machine at the newly determined suck back speed.

2. The control device for the injection molding machine according to claim 1, wherein the processor is further configured to:
store a table in the memory in which there are defined a plurality of coefficients corresponding to types of the screw;
select one of the coefficients by referring to the table and based on the type of the screw, and calculate the compensation amount based on a product of the selected coefficient and the difference.

3. The control device for the injection molding machine according to claim 2, wherein:
the table defines the plurality of coefficients corresponding to the types of the screw and types of the resin; and
the selection of one of the coefficients is by referring to the table and based on the type of the screw and the type of the resin.

4. The control device for the injection molding machine according to claim 1, wherein the processor is further configured to receive instruction of the target pressure from an operator.

5. The control device fur the injection molding machine according to claim 1, wherein the processor is further configured to issue a notification of at least one of the difference calculated, the compensation amount calculated, and the suck back speed newly determined.

6. The control device for the injection molding machine according to claim 1, wherein the processor is further configured to:
count a number of times the compensation amount is calculated; and
cumulatively store the compensation amount calculated in the memory;
wherein the processor does not newly determine the suck back speed based on the compensation amount until the number of times the processor has calculated the compensation amount reaches a predetermined number of times, and when the number of times that the processor has calculated the compensation amount reaches the predetermined number of times, the processor obtains one of a minimum value, a maximum value, an average value, a median value, and a mode value of the plurality of compensation amounts stored in the memory, and newly determines the suck back speed based on the obtained value.

7. The control device for the injection molding machine according to claim 1, wherein the processor is configured to acquire the pressure of the resin from the sensor connected to the screw.

8. The control device for the injection molding machine according to claim 1, wherein the processor is configured to acquire the pressure of the resin detected by the sensor provided on the screw.

9. The control device for the injection molding machine according to claim 1, wherein the processor controls the injection molding machine.

10. The control device for the injection molding machine according to claim 1, wherein the processor controls the injection molding machine according to the newly determined suck back speed based on the compensation amount.

11. The control device for the injection molding machine according to claim 1, wherein the processor controls the screw and the cylinder of the injection molding machine according to the newly determined suck back speed based on the compensation amount.

12. A method of controlling an injection molding machine, the injection molding machine including a cylinder into which a resin is supplied, and a screw configured to move forward and rearward and rotate inside the cylinder, the injection molding machine being configured to perform metering of the resin while the resin is being melted inside the cylinder, by causing the screw to be moved rearward to a predetermined metering position while being forwardly rotated, the method comprising:
sucking back the screw, based on a predetermined suck back speed and a suck back distance or a suck back time period, after the screw has reached the predetermined metering position;
acquiring a pressure of the resin at a time when sucking back is completed;
calculating, based on a difference between the pressure of the resin at the time when sucking back is completed and a predetermined target pressure, a compensation amount of the suck back speed that causes the pressure of the resin to reach the target pressure at a time when sucking back is performed based on the suck back distance or the suck back time period; and
newly determining the suck back speed based on the compensation amount.

* * * * *